United States Patent
Xie et al.

(10) Patent No.: US 8,512,427 B2
(45) Date of Patent: Aug. 20, 2013

(54) ACRYLATE POLYURETHANE CHEMICAL MECHANICAL POLISHING LAYER

(75) Inventors: Jia Xie, Lake Jackson, TX (US); David B. James, Newark, DE (US); Chau H. Duong, Newark, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 13/248,123

(22) Filed: Sep. 29, 2011

(65) Prior Publication Data
US 2013/0084702 A1  Apr. 4, 2013

(51) Int. Cl.
*B24D 3/28* (2006.01)
*B24D 15/00* (2006.01)
*B24D 18/00* (2006.01)
*C08G 18/67* (2006.01)
*C09K 3/14* (2006.01)

(52) U.S. Cl.
USPC ............ 51/298; 451/526; 451/533; 451/539; 522/90; 528/49; 528/61; 528/63; 528/64; 528/75

(58) Field of Classification Search
USPC .................... 528/49, 61, 63, 64, 75; 522/90; 51/298; 451/526, 533, 539
See application file for complete search history.

(56) References Cited

U.S. PATENT DOCUMENTS

| | | | |
|---|---|---|---|
| 4,057,431 A | 11/1977 | Finelli et al. | |
| 4,721,751 A | 1/1988 | Schappert et al. | |
| 4,855,184 A | 8/1989 | Klun et al. | |
| 5,341,799 A | 8/1994 | Fifield et al. | |
| 5,965,460 A | 10/1999 | Rach et al. | |
| 7,329,170 B2 | 2/2008 | Ono et al. | |
| 2003/0217517 A1* | 11/2003 | Allison et al. | 51/298 |
| 2011/0054057 A9 | 3/2011 | Kulp | |

* cited by examiner

*Primary Examiner* — Rabon Sergent
(74) *Attorney, Agent, or Firm* — Thomas S. Deibert

(57) ABSTRACT

A chemical mechanical polishing pad comprising an acrylate polyurethane polishing layer, wherein the polishing layer exhibits a tensile modulus of 65 to 500 MPa; an elongation to break of 50 to 250%; a storage modulus, G', of 25 to 200 MPa; a Shore D hardness of 25 to 75; and a wet cut rate of 1 to 10 μm/min.

7 Claims, No Drawings

ACRYLATE POLYURETHANE CHEMICAL MECHANICAL POLISHING LAYER

The present invention relates to chemical mechanical polishing pads and methods of making and using the same. More particularly, the present invention relates to a chemical mechanical polishing pad comprising an acrylate polyurethane polishing layer, wherein the polishing layer exhibits a tensile modulus of 65 to 500 MPa; an elongation to break of 50 to 250%; a storage modulus, G', of 25 to 200 MPa; a Shore D hardness of 25 to 75; and a wet cut rate of 1 to 10 μm/min.

In the fabrication of integrated circuits and other electronic devices, multiple layers of conducting, semiconducting and dielectric materials are deposited onto and removed from a surface of a semiconductor wafer. Thin layers of conducting, semiconducting and dielectric materials may be deposited using a number of deposition techniques. Common deposition techniques in modern wafer processing include physical vapor deposition (PVD), also known as sputtering, chemical vapor deposition (CVD), plasma-enhanced chemical vapor deposition (PECVD) and electrochemical plating, among others. Common removal techniques include wet and dry isotropic and anisotropic etching, among others.

As layers of materials are sequentially deposited and removed, the uppermost surface of the wafer becomes nonplanar. Because subsequent semiconductor processing (e.g., metallization) requires the wafer to have a flat surface, the wafer needs to be planarized. Planarization is useful for removing undesired surface topography and surface defects, such as rough surfaces, agglomerated materials, crystal lattice damage, scratches and contaminated layers or materials.

Chemical mechanical planarization, or chemical mechanical polishing (CMP), is a common technique used to planarize or polish work pieces such as semiconductor wafers. In conventional CMP, a wafer carrier, or polishing head, is mounted on a carrier assembly. The polishing head holds the wafer and positions the wafer in contact with a polishing layer of a polishing pad that is mounted on a table or platen within a CMP apparatus. The carrier assembly provides a controllable pressure between the wafer and polishing pad. Simultaneously, a polishing medium (e.g., slurry) is dispensed onto the polishing pad and is drawn into the gap between the wafer and polishing layer. To effect polishing, the polishing pad and wafer typically rotate relative to one another. As the polishing pad rotates beneath the wafer, the wafer sweeps out a typically annular polishing track, or polishing region, wherein the wafer's surface directly confronts the polishing layer. The wafer surface is polished and made planar by chemical and mechanical action of the polishing layer and polishing medium on the surface.

Pad surface "conditioning" or "dressing" is critical to maintaining a consistent polishing surface for stable polishing performance. Over time the polishing surface of the polishing pad wears down, smoothing over the microtexture of the polishing surface—a phenomenon called "glazing". Polishing pad conditioning is typically achieved by abrading the polishing surface mechanically with a conditioning disk. The conditioning disk has a rough conditioning surface typically comprised of imbedded diamond points. The conditioning disk is brought into contact with the polishing surface either during intermittent breaks in the CMP process when polishing is paused ("ex situ"), or while the CMP process is underway ("in situ"). Typically the conditioning disk is rotated in a position that is fixed with respect to the axis of rotation of the polishing pad, and sweeps out an annular conditioning region as the polishing pad is rotated. The conditioning process as described cuts microscopic furrows into the pad surface, both abrading and plowing the pad material and renewing the polishing texture.

A family of polyurethane polishing layers exhibiting excellent planarization and defectivity performance are disclosed by Kulp in U.S. Pat. No. 7,169,030. Kulp discloses a polishing pad comprising a polymeric matrix, the polymeric matrix having a top polishing surface, the top polishing surface having polymeric polishing asperities or forming polymeric polishing asperities upon conditioning with an abrasive, the polymeric polishing asperities extending from the polymeric matrix and being a portion of the top polishing surface that can contact a substrate during polishing, the polishing pad fanning additional polymeric polishing asperities from the polymeric material with wear or conditioning of the top polishing surface, and the polymeric polishing asperities being from a polymeric material having a bulk ultimate tensile strength of at least 6,500 psi (44.8 MPa) and a bulk tear strength of at least 250 lb/in. (4.5×103 g/mm).

Conventional polishing layer materials that achieve low defectivity during polishing of semiconductor wafers tend to be relatively soft and exhibit high elongation to break values (>250%). This balance of properties inhibit the formation of texture and asperities by diamond conditioning.

Accordingly, there is a continuing need for polishing layer formulations that provide a physical property profile that correlates well with that associated with low defect formulations, but which also imparts enhanced conditionability to the polishing layer.

The present invention provides a chemical mechanical polishing pad for polishing a substrate selected from at least one of a magnetic substrate, an optical substrate and a semiconductor substrate; comprising a polishing layer, wherein the polishing layer comprises the reaction product of raw material ingredients, comprising: (a) an isocyanate-terminated urethane prepolymer prepared from the reaction of (i) a polyfunctional isocyanate, and (ii) a prepolymer polyol; wherein the isocyanate-terminated urethane prepolymer has 4 to 12 wt % unreacted NCO groups; (b) a polyamine chain extender; (c) an acrylate selected from the group consisting of hydroxyalkyl (alkyl)acrylates and 2-aminoethyl (meth)acrylate; and, (d) a free radical initiator; wherein the polishing layer exhibits a tensile modulus of 65 to 500 MPa; an elongation to break of 50 to 250%; a storage modulus, G', of 25 to 200 MPa; a Shore D hardness of 25 to 75; and a wet cut rate of 1 to 10 μm/min.

The present invention also provides a method of making a chemical mechanical polishing pad according to claim 1, comprising: (a) providing an isocyanate-terminated urethane prepolymer having 4 to 12 wt % unreacted NCO prepared from the reaction of a polyfunctional isocyanate, and a prepolymer polyol; (b) providing a polyamine chain extender; (c) providing an acrylate selected from the group consisting of hydroxyalkyl (alkyl)acrylates and 2-aminoethyl (meth) acrylate; (d) providing a free radical initiator; (e) mixing the isocyanate-terminated urethane prepolymer and the acrylate; (f) adding the polyamine chain extender to the combination of (e); (g) adding the free radical initiator to the combination of (f); and, (h) initiating a polymerization of the combination of (g) forming a polishing layer.

The present invention also provides a method of polishing a substrate, comprising: providing a substrate selected from at least one of a magnetic substrate, an optical substrate and a semiconductor substrate; providing a chemical mechanical polishing pad according to claim 1; creating dynamic contact between a polishing surface of the polishing layer and the substrate to polish a surface of the substrate; and, conditioning of the polishing surface with an abrasive conditioner.

DETAILED DESCRIPTION

The polishing layer of the chemical mechanical polishing pad of the present invention, comprises the reaction product of raw material ingredients, comprising: (a) an isocyanate-terminated urethane prepolymer prepared from the reaction of (i) a polyfunctional isocyanate, and (ii) a prepolymer polyol; wherein the isocyanate-terminated urethane prepolymer has 4 to 12 wt % unreacted NCO groups (preferably 5 to 10 wt % unreacted NCO groups; most preferably 5 to 9 wt % unreacted NCO groups). Preferably, the isocyanate-terminated urethane prepolymer exhibits a number average molecular weight, $MW_N$, of 400 to 5,000 (more preferably 400 to 4,000; most preferably 400 to 2,500); (b) a polyamine chain extender; and, (c) an acrylate selected from the group consisting of hydroxyalkyl (alkyl)acrylates and 2-aminoethyl (meth)acrylate; wherein the polishing layer exhibits a tensile modulus of 65 to 500 MPa (preferably 100 to 350 MPa); an elongation to break of 50 to 250% (preferably 50 to 150%; more preferably 50 to 125%); a storage modulus, G', of 25 to 200 MPa; a Shore D hardness of 25 to 75 (preferably 30 to 65; more preferably 40 to 60); and a wet cut rate of 1 to 10 µm/min (preferably 1 to 7.5 µm/min) all as measured using the methods and the conditions set forth in the Examples. The polishing layer preferably further exhibits a tensile strength of 5 to 50 MPa (more preferably 10 to 40 MPa) as measured using the method and conditions set forth in the Examples. The polishing layer preferably further exhibits an asperity wear of <15% (over a 10 minute period) as measured using the method and conditions set forth in the Examples. The polishing layer preferably further exhibits a hydrolytic stability of $\leq 1.5\%$ as measured using the method and conditions set forth in the Examples.

Preferably, the polyfunctional isocyanate used as a raw material ingredient in the preparation of the polishing layer of the chemical mechanical polishing pad of the present invention is selected from an aliphatic polyfunctional isocyanate, an aromatic polyfunctional isocyanate and a mixture thereof. More preferably, the polyfunctional isocyanate is selected from an aliphatic diisocyanate; an aromatic diisocyanate; and, a mixture thereof. Still more preferably, the polyfunctional isocyanate is selected from 1,6-hexane diisocyanate (HDI); isophorone diisocyanate (PDI); methylene bis(p-cyclohexyl isocyanate)($H_{12}$MDI); toluene diisocyanate (e.g., 2,4-toluene diisocyanate; 2,6-toluene diisocyanate); diphenylmethane diisocyanate; naphthalene diisocyanate (e.g., naphthalene-1,5-diisocyanate); tolidine diisocyanate; 3,3'-bitoluene diisocyanate; diphenyl-4,4'-diisocyanate; tetramethylxylylene diisocyanate; para-phenylene diisocyanate; xylylene diisocyanate; and, a mixture thereof. Yet still more preferably, the polyfunctional isocyanate is selected from 2,4-toluene diisocyanate; 2,6-toluene diisocyanate; diphenylmethane diisocyanate; naphthalene diisocyanate; tolidine diisocyanate; 3,3'-bitoluene diisocyanate; diphenyl-4,4'-diisocyanate; tetramethylxylylene diisocyanate; para-phenylene diisocyanate; xylylene diisocyanate; and, a mixture thereof. Most preferably, the polyfunctional isocyanate is selected from 2,4-toluene diisocyanate; 2,6-toluene diisocyanate; and, a mixture thereof.

Preferably, the prepolymer polyol used as a raw material ingredient in the preparation of the polishing layer of the chemical mechanical polishing pad of the present invention is selected from a polyether polyol (e.g., polytetramethylene ether glycol, polypropylene ether glycol); a polycarbonate polyol; a polyester polyol (e.g., ethylene adipate, butylene adipate); a polycaprolactone polyol; a copolymer thereof; and, a mixture thereof. More preferably, the prepolymer polyol is selected from a polytetramethylene ether glycol (PTMEG), a polypropylene ether glycol (PPG), a polyester polyol, a polycaprolactone polyol, a copolymer thereof, and a mixture thereof. Still more preferably, the prepolymer polyol is selected from a PTMEG; a PPG; and, a mixture thereof. Most preferably, the prepolymer polyol is a PTMEG.

Preferably, the polyamine chain extender used as a raw material ingredient in the preparation of the polishing layer of the chemical mechanical polishing pad of the present invention is selected from 4,4'-methylene-bis-(2-chloroaniline); 4,4'-methylene-bis-(3-chloro-2,6-diethylaniline); diethyltoluenediamine; dimethylthiotoluenediamine; 4,4'-bis(sec-butylamino)diphenylmethane; 3,3'-methylene-bis(6 amino-, 1,1-dimethyl ester); 1,3-propanediol bis-(4-aminobenzoate); 4,4'-methylene-bis-(2,6-diethylaniline); 4,4'-methylene-bis-(2,6-diisopropylaniline); 4,4'-methylene-bis-(2-isopropyl-6-methylaniline); 2-[2-(2-aminophenyl)sulfanylethylsulfanyl]aniline; 4,4'-methylene-bis-(2-chloroaniline); 4,4-methylene bis(N-sec-butylaniline); triethylenediamine; and a mixture thereof. More preferably, the polyamine chain extender is selected from polyamine chain extenders having a formula selected from:

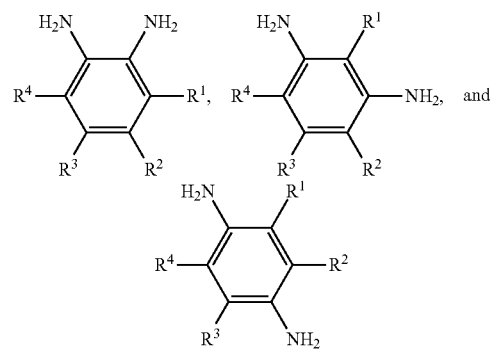

wherein $R^1$, $R^2$, $R^3$ and $R^4$ are independently selected from a hydrogen, a $C_{1-4}$ alkyl group, and a $C_{1-4}$ alkylthio group. Still more preferably, the polyamine chain extender is selected from a dialkyltoluenediamine (e.g., 3,5-dialkyltoluene-2,4-diamine; 3,5-dialkyltoluene-2,6-diamine); a dialkylthiotoluenediamine (e.g., 3,5-dialkylthiotoluene-2,4-diamine); and a mixture thereof. Yet still more preferably, the polyamine chain extender is selected from a diethyltoluenediamine (e.g., 3,5-diethyltoluene-2,4-diamine; 3,5-dialkyltoluene-2,6-diamine; and mixtures thereof); a dimethylthiotoluenediamine (e.g., 3,5-dimethylthiotoluene-2,4-diamine); and a mixture thereof. Most preferably, the polyamine chain extender is selected from 3,5-diethyltoluene-2,4-diamine; 3,5-dialkyltoluene-2,6-diamine; 3,5-dimethylthiotoluene-2,4-diamine; and a mixture thereof.

Preferably, the acrylate used as a raw material ingredient in the preparation of the polishing layer of the chemical mechanical polishing pad of the present invention is a hydroxy $C_{1-8}$ alkyl ($C_{1-8}$ alkyl)acrylate. More preferably, the acrylate is selected from hydroxyethyl methacrylate (HEMA); hydroxypropyl methacrylate; polypropylene glycol monomethacrylate; and, a mixture thereof. Most preferably, the acrylate is hydroxyethyl methacrylate (HEMA).

Preferably, when the acrylate used as a raw material ingredient in the preparation of a polishing layer of the chemical mechanical polishing pad of the present invention is 2-aminoethyl (meth)acrylate; the equivalent ratio of amine groups in the acrylate to unreacted NCO groups in the isocyanate-terminated urethane prepolymer ($NH_2$/NCO) is preferably 0.1 to 0.9 (more preferably 0.2 to 0.8; still more preferably 0.3 to 0.7; most preferably 0.4 to 0.6); and, the equivalent ratio of amine groups in the polyamine chain extender to unreacted NCO groups in the isocyanate-terminated urethane prepolymer ($NH_2$/NCO) is preferably 0.9 to 0.1 (more preferably 0.8 to 0.2; still more preferably 0.7 to 0.3; most preferably 0.6 to 0.4). Most preferably, when the acrylate is 2-aminoethyl (meth)acrylate, the equivalent ratio of amine groups in the acrylate to unreacted NCO groups in the isocyanate-terminated urethane prepolymer (OH/NCO) is 0.4 to 0.6; and, the equivalent ratio of amine groups in the polyamine chain extender to unreacted NCO groups in the isocyanate-terminated urethane prepolymer ($NH_2$/NCO) is 0.6 to 0.4.

Preferably, when the acrylate used as a raw material ingredient in the preparation of a polishing layer of the chemical mechanical polishing pad of the present invention is a hydroxyalkyl (alkyl)acrylate, the equivalent ratio of hydroxyl groups in the acrylate to unreacted NCO groups in the isocyanate-terminated urethane prepolymer (OH/NCO) is preferably 0.1 to 0.9 (more preferably 0.2 to 0.8; still more preferably 0.3 to 0.7; most preferably 0.4 to 0.6) and the equivalent ratio of amine groups in the polyamine chain extender to unreacted NCO groups in the isocyanate-terminated urethane prepolymer ($NH_2$/NCO) is preferably 0.9 to 0.1 (more preferably 0.8 to 0.2; still more preferably 0.7 to 0.3; most preferably 0.6 to 0.4. Most preferably, when the acrylate is a hydroxyalkyl (alkyl)acrylate, the equivalent ratio of hydroxyl groups in the acrylate to unreacted NCO groups in the isocyanate-terminated urethane prepolymer (OH/NCO) is preferably 0.4 to 0.6 and the equivalent ratio of amine groups in the polyamine chain extender to unreacted NCO groups in the isocyanate-terminated urethane prepolymer ($NH_2$/NCO) is 0.6 to 0.4.

The free radical initiator used as a raw material ingredient in the preparation of the polishing layer of the chemical mechanical polishing pad of the present invention can be chosen from among a wide variety of compounds, including, for example, thermal initiators and photoinitiators. Thermal initiators include, for example, azo free-radical initiators (e.g., 2,2'-azobis(isobutyronitrile)("AIBN") and 2,2'-azobis (2,4-dimethyvaleronitrile)); and, peroxide or perester initiators (e.g., benzoyl peroxide; decanoyl peroxide; Lauroyl peroxide; succinic acid peroxide; dicumyl peroxide; 2,5-Di(t-butylperoxy)-2,5-dimethylhexane; t-butyl cumyl peroxide); t-butyl peroctoate; di-t-butyl peroxide; cumene hydroperoxide; propylhydroperoxide; isopropyl hydroperoxide; t-amyl-2-ethylhexanoate; t-amyl peroxypivalate; t-butyl peroxypivalate; t-amyl peroxy-2-ethylhexanoate; and, t-butyl peroxy-2-ethylhexanoate. Photoinitiators include, for example, 2,2-dimethoxy-2-phenylacetophenone; 2,2-diethoxyacetophenone; 1-hydroxycyclohexyl phenyl ketone). One of ordinary skill in the art, with the benefit of this disclosure, will be able to select an appropriate free radical initiator.

The polishing layer of the present invention, wherein the raw material ingredients optionally further comprise a diol chain extender. Preferably, the optional diol chain extender is selected from ethylene glycol; 1,2-propylene glycol; 1,3-propylene glycol; 1,3-propanediol; 1,1,1-trimethylolpropane; 1,2-butanediol; 1,4-butanediol; 1,3-butanediol; 2-methyl-1, 3-propanediol; 1,4-butanediol; neopentyl glycol; 1,5-pentanediol; 3-methyl-1,5-pentanediol; 1,6-hexanediol; diethylene glycol; dipropylene glycol; hydroxyethyl resorcinol; hydroquinone bis(hydroxyethyl)ether; and, a mixture thereof. More preferably, the optional diol chain extender is selected from ethylene glycol; 1,2-propylene glycol; 1,3-propylene glycol; 1,2-butanediol; 1,3-butanediol; 2-methyl-1,3-propanediol; 1,4-butanediol; neopentyl glycol; 1,5-pentanediol; 3-methyl-1,5-pentanediol; 1,6-hexanediol; diethylene glycol; dipropylene glycol; and, a mixture thereof. Most preferably, the optional diol chain extender is selected from 1,2-butanediol; 1,3-butanediol; 1,4-butanediol; and a mixture thereof.

The polishing layer of the chemical mechanical polishing pad of the present invention can be provided in both porous and nonporous (i.e., unfilled) configurations. The polishing layer preferably has a density of 0.4 to 1.3 $g/cm^3$. Porous polishing layers more preferably have a density of 0.5 to 1 $g/cm^3$.

The polishing layer of the present invention optionally further comprises a plurality of microelements. Preferably, the plurality of microelements are uniformly dispersed throughout the polishing layer. Preferably, the plurality of microelements is selected from entrapped gas bubbles, hollow core polymeric materials, liquid filled hollow core polymeric materials, water soluble materials and an insoluble phase material (e.g., mineral oil). More preferably, the plurality of microelements is selected from entrapped gas bubbles and hollow core polymeric materials uniformly distributed throughout the polishing layer. Preferably, the plurality of microelements has a weight average size of 2 to 100 μm (15 to 90 μm). Preferably, the plurality of microelements comprise polymeric microballoons with shell walls of either polyacrylonitrile or a polyacrylonitrile copolymer (e.g., Expancel™ from Akzo Nobel).

The method of making a chemical mechanical polishing pad of the present invention, comprises: (a) providing an isocyanate-terminated urethane prepolymer having 4 to 12 wt % unreacted NCO prepared from the reaction of a polyfunctional isocyanate, and a prepolymer polyol (preferably 5 to 10 wt % unreacted NCO groups; most preferably 5 to 9 wt % unreacted NCO groups); (b) providing a polyamine chain extender; (c) providing an acrylate selected from the group consisting of hydroxyalkyl (alkyl)acrylates and 2-aminoethyl (meth)acrylate; (d) providing a free radical initiator; (e) mixing the isocyanate-terminated urethane prepolymer and the acrylate; (f) adding the polyamine chain extender to the mixture of (e); (g) adding the free radical initiator to the combination of (f); and, (h) initiating a polymerization of the combination of (g) forming a polishing layer. The method of making the chemical mechanical polishing pad of the present invention, optionally further comprises providing a diol chain extender, adding the diol chain extender during the preparation of the isocyanate-terminated urethane prepolymer in (a), and, optionally, adding the diol chain extender to the isocyanate-terminated urethane prepolymer before combining with the acrylate in (e).

Preferably, in the method of making a chemical mechanical polishing pad of the present invention, initiating a polymerization of the combination of (g), optionally, comprises: heating the combination of (g) or subjecting the combination of (g) to electromagnetic energy.

Preferably, in the method of making a chemical mechanical polishing pad of the present invention, before initiating a polymerization of the combination of (g), the combination of (g) is either transferred to a mold cavity (e.g., an injection mold, a compression mold, an open mold) or transferred to a carrier film.

In the method of providing a chemical mechanical polishing pad of the present invention, wherein the acrylate provided is 2-aminoethyl (meth)acrylate; the acrylate is preferably provided at an equivalent ratio of amine groups in the acrylate to unreacted NCO groups in the isocyanate-terminated urethane prepolymer (NH$_2$/NCO) of 0.1 to 0.9 (more preferably 0.2 to 0.8; still more preferably 0.3 to 0.7; most preferably 0.4 to 0.6); and, the polyamine chain extender is preferably provided at an equivalent ratio of amine groups in the polyamine chain extender to unreacted NCO groups in the isocyanate-terminated urethane prepolymer (NH$_2$/NCO) of 0.9 to 0.1 (more preferably 0.8 to 0.2; still more preferably 0.7 to 0.3; most preferably 0.6 to 0.4).

In the method of providing a chemical mechanical polishing pad of the present invention, wherein the acrylate provided is a hydroxyalkyl (alkyl)acrylate, the hydroxyalkyl (alkyl)acrylate is preferably provided an equivalent ratio of hydroxyl groups in the acrylate to unreacted NCO groups in the isocyanate-terminated urethane prepolymer (OH/NCO) of 0.1 to 0.9 (more preferably 0.2 to 0.8; still more preferably 0.3 to 0.7; most preferably 0.4 to 0.6) and the polyamine chain extender is preferably provided at an equivalent ratio of amine groups in the polyamine chain extender to unreacted NCO groups in the isocyanate-terminated urethane prepolymer (NH$_2$/NCO) of 0.9 to 0.1 (more preferably 0.8 to 0.2; still more preferably 0.7 to 0.3; most preferably 0.6 to 0.4).

Some embodiments of the present invention will now be described in detail in the following Examples.

COMPARATIVE EXAMPLES C1-C4

The polishing layer materials of Comparative Examples C1-C4 were prepared by mixing the toluene diisocyanate terminated prepolymer noted in TABLE 1 (preheated to 50° C.) with 4,4'-methylene-bis-o-chloroaniline (MBCA) (preheated to 115° C.). The ratio of prepolymer to curative used was determined by the stoichiometric ratio of unreacted NCO groups in the prepolymer to amine groups in the MBCA noted in TABLE 1. In Comparative Examples C2 and C4, porosity was introduced to the mixture of prepolymer and MBCA through the addition of polymeric microballoons sold under the Expancel® trade name from Akzo-Nobel. The type and wt % of Expancel® pore former added is shown in TABLE 1. The Expancel® pore former was combined with the mixture of prepolymer and MBCA using a high speed shear mixer at approximately 3600 rpm to evenly distribute the pore former throughout the prepolymer and MBCA mixture. The final mixture of prepolymer and MBCA (and also Expancel® pore former for Examples C2 and C4) was then transferred to a mold and permitted to gel for about 15 minutes.

The molds were then placed in a curing oven and cured using the following thermal cycle: a thirty minute ramp of the curing oven's set point temperature from ambient temperature to a set point of 104° C.; followed by a fifteen and one half hours hold of the curing oven's set point temperature at a set point of 104° C.; followed by a drop in the curing oven's set point temperature to 21° C. and a two hour hold with the set point temperature at 21° C.

The product cakes were then demolded and sliced to provide 0.2 cm thick polishing layers.

TABLE 1

| | Comparative Example # | | | |
|---|---|---|---|---|
| | C1 | C2 | C3 | C4 |
| Prepolymer | Adiprene® LFG963A | Adiprene® LFG963A | Adiprene® LF750D | Adiprene® LF750D |
| Unreacted NCO (wt %) | 5.8 | 5.8 | 8.9 | 8.9 |
| Stoichiometry (NH$_2$/unreacted NCO) | 0.9 | 0.9 | 1.035 | 1.035 |
| Pore Former (wt %) | 0 | 1.25 | 0 | 1.10 |
| Pore Former Type | | Expancel® 551DE40d42 | | Expancel® 551DE20d60 |

Adiprene® prepolymers are available from Chemtura.

EXAMPLE 1

Preparation of Unfilled Polishing Layer

A toluene diisocyanate terminated polypropylene glycol prepolymer having 5.8 wt % unreacted NCO groups (830.8 g)(Adiprene® LFG 963A available from Chemtura) and 2-hydroxyethyl methacrylate (HEMA)(87.1 g) were added to a one gallon container. Then dibutyltin dilaurate (3 g) was added to the container. The contents of the container were then mixed for 1.5 minutes using a Vortex mixer set at 1,000 rpm. Then a diethyltoluene diamine chain extender (58.1 g)(Ethacure® 100-LC from Albemarle®) was added to the container. Then 2,2'-azobis(2-methylpropionitrile) (AIBN) (1 g dissolved in 5 mL of acetone) was added to the container. The contents of the container were then mixed for 1 minute using a Vortex mixer set at 1,000 rpm. The contents of the container were then poured into a 66 cm×66 cm compression mold with a 0.2 cm spacer. The filled mold was then placed in a heat press and cured at 120° C. under pressure for 1 hour. The mold was then removed from the heat press and the product polishing layer was removed from the mold.

EXAMPLE 2

Preparation of Unfilled Polishing Layer

A toluene diisocyanate terminated poly(tetramethylene ether) glycol prepolymer having 8.9 wt % unreacted NCO groups (793.3 g)(Adiprene® LF 750D from Chemtura) and 2-hydroxyethyl methacrylate (HEMA)(124 g) were added to a one gallon container. Then dibutyltin dilaurate (3 g) was added to the container. The contents of the container were then mixed for 1.5 minutes using a Vortex mixer set at 1,000 rpm. Then a diethyltoluene diamine chain extender (82.7 g)(Ethacure® 100-LC available from Albemarle®) was added to the container. Then 2,2'-azobis(2-methylpropionitrile) (AIBN) (1 g dissolved in 5 mL of acetone) was added to the container. The contents of the container were then mixed for 1 minute using a Vortex mixer set at 1,000 rpm. The contents of the container were then poured into a 66 cm×66 cm compression mold with a 0.2 cm spacer. The filled mold was then placed in a heat press and cured at 120° C. under pressure for 1 hour. The mold was then removed from the heat press and the polishing layer was removed from the mold.

EXAMPLE 3

Polishing Layer Properties

Various properties of the polishing layers prepared in each of Examples 1-2 and in the Comparative Examples C1-C4 were measured with the results provided in TABLE 2, namely: hardness (Shore D); tensile strength; elongation to break; tensile modulus; toughness; storage modulus, G'; wet cut rate; asperity wear and hydrolytic stability.

The hardness (in Shore D scale) of the polishing layers was measured in accordance with ASTM D2240-05 using a Shore Leverloader with Type D digital scale available from Instron. Measurements were made using a load of 4 kg with a 15 second delay.

The tensile properties of the polishing layers (i.e., tensile modulus, tensile strength, elongation to break) were measured according to ASTM D1708-10 using an Alliance RT/5 mechanical tester available from MTS Systems Corporation as a crosshead speed of 2.54 cm/min. All testing was performed in a temperature and humidity controlled laboratory set at 23° C. and a relative humidity of 50%. All of the test samples were conditioned under the noted laboratory conditions for 5 days before performing the testing. The reported tensile modulus (MPa), tensile strength (MPa) and elongation to break (%) for each polishing layer material were determined from stress-strain curves of four replicate samples.

The storage modulus, G', of the polishing layers was measured according to ASTM D5279-08 using a TA Instruments ARES Rheometer with torsion fixtures. Liquid nitrogen that was connected to the instrument was used for sub-ambient temperature control. The linear viscoelastic response of the samples was measured at a test frequency of 1 Hz with a temperature ramp of 3° C./min from −100° C. to 200° C. The test samples were stamped out of product polishing layers using a 47.5 mm×7 mm die on an Indusco hydraulic swing arm cutting machine and then cut down to approximately 35 mm in length using scissors.

The wet cut rate and asperity wear data for the polishing layers was measured using a 6EC Strasbaugh polishing tool. This polishing tool has a 22" (~56 cm) platen that can accommodate a 20" (~51 cm) diameter polishing layer sample size. Before performing the wet cut rate and asperity wear testing, the polishing layer samples were buffed using a belt sander; cut into circular shaped pads; grooved with a circular groove pattern having dimensions of 120 mil pitch, 20 mil width and 20 mil depth; and then laminated to a foam subpad layer (SP2310 available from Rohm and Haas Electronic Materials CMP Inc.).

For the wet cut rate measurement, a polishing pad conditioning disk (DiaGrid® AD3BG-150855 pad conditioner manufactured by Kinik Company available from Rohm and Haas Electronic Materials CMP Inc.) was used to abrade the polishing layer using the following parameters: duration, the polishing layers were subjected to continuous abrasion from the diamond conditions disk for a period of 2 hours; platen speed, 100 rpm; slurry, deionized water; slurry flow rate, 150 cm$^3$/min; and conditioning disk down force, 62.1 kPa. The wet cut rate (i.e., change in average groove depth over time) was measured (in μm/min) using an MTI Instruments Microtrack II Laser Triangulation Sensor mounted on a Zaber Technologies Motorized Slide to profile the surface of the polishing layer from the center of rotation of a stationary polishing layer to the outer edge of the polishing layer. The sweep speed of the sensor on the slide was 0.732 mm/s and the sampling rate (measurements/mm of sweep) for the sensor was 6.34 points/mm. The reported wet cut rate is the arithmetic average reduction in groove depth over time, based on the collected thickness measurements taken as >2,000 points across the surface of the polishing layer.

The asperity wear measurement was performed using the same polishing layer samples used to measure wet cut rate, following the wet cut rate determination. The purpose of this test is to study the glazing response of a polishing layer material under simulated wafer polishing conditions (i.e., polishing an 8" dia. quartz slug) with no subsequent diamond conditioning. The test parameters used are as follows: platen speed, 53 rpm; head speed, 51 rpm; down force, 27.6 kPa (w/6.9 kPa back pressure); slurry: ILD 3225 (available from Nitta-Haas, Inc.); slurry flow rate, 150 cm$^3$/min; duration, 1 min, 1 min, 3 min and 5 min for a total of 10 minutes. Samples were cut from the polishing layers at each of the time intervals for optical surface analysis using a Wyko NT8000 Optical Profiling System from Veeco Instruments, Inc. running Vision, version 32, software, to measure the reduction in surface roughness compared to the roughness of the starting material (in % reduction).

The hydrolytic stability of the polishing layer materials was determined by measuring the change in linear dimension (in %) of a sample of each polishing layer material following immersion of the sample in deionized water for 24 hours at room temperature.

TABLE 2

|  | Polishing layer material | | | | | |
| --- | --- | --- | --- | --- | --- | --- |
|  | C1 | C2 | C3 | C4 | Ex. 1 | Ex. 2 |
| Hardness (Shore D) | 50 | 41 | 67 | 59 | 50 | 61 |
| Tensile strength (MPa) | 23 | 15 | 48 | 31 | 14 | 25 |
| Elongation to break (%) | 412 | 293 | 323 | 199 | 107 | 62 |
| Tensile modulus (MPa) | 119 | 95 | 431 | 303 | 114 | 341 |
| Storage modulus (MPa) | 61 | 49 | 154 | 115 | 43 | 112 |
| Wet cut rate (μm/min) | 0.9 | 0.2 | 0.8 | 0.1 | 4.3 | 7.4 |
| Asperity wear @ 10 min (%) | — | 1 | — | — | 13 | 4 |
| Hydrolytic stability (%) | <0.2 | <0.2 | <0.2 | <0.2 | 1.2 | — |

We claim:

1. A chemical mechanical polishing pad for polishing a substrate selected from at least one of a magnetic substrate, an optical substrate and a semiconductor substrate; comprising a polishing layer, wherein the polishing layer comprises the reaction product of ingredients, comprising:
   (a) an isocyanate-terminated urethane prepolymer prepared from the reaction of
      (i) a polyfunctional isocyanate, and
      (ii) a polyol;
      wherein the isocyanate-terminated urethane prepolymer has 4 to 12 wt % unreacted NCO groups;
   (b) a polyamine chain extender;
   (c) an acrylate selected from the group consisting of hydroxyalkyl (alkyl)acrylates and 2-aminoethyl (meth)acrylate; and,
   (d) a free radical initiator;
   wherein the polishing layer exhibits a tensile modulus of 65 to 500 MPa; an elongation to break of 50 to 250%; a storage modulus, G', of 25 to 200 MPa; a Shore D hardness of 25 to 75; and a wet cut rate of 1 to 10 μm/min.

2. The chemical mechanical polishing pad of claim 1, wherein the polyfunctional isocyanate is selected from the group consisting of an aliphatic polyfunctional isocyanate, an aromatic polyfunctional isocyanate and a mixture thereof.

3. The chemical mechanical polishing pad of claim 1, wherein the polyol is selected from the group consisting of a polyether polyol; a polycarbonate polyol; a polyester polyol; a polycaprolactone polyol; a copolymer thereof and a mixture thereof.

4. The chemical mechanical polishing pad of claim 1, wherein the polyamine chain extender is selected from the group consisting of 4,4'-methylene-bis-(2-chloroaniline); 4,4'-methylene-bis-(3-chloro-2,6-diethylaniline); diethyltoluenediamine; dimethylthiotoluenediamine; 4,4'-bis(sec-butylamino)diphenylmethane; 1,3-propanediol bis-(4-aminobenzoate); 4,4'-methylene-bis-(2,6-diethylaniline); 4,4'-methylene-bis-(2,6-diisopropylaniline); 4,4'-methylene-bis-(2-isopropyl-6-methylaniline); 2-[2-(2-aminophenyl)sulfanylethylsulfanyl]aniline; 4,4'-methylene-bis-(2-chloroaniline); 4,4-methylene bis(N-sec-butylaniline); and a mixture thereof.

5. The chemical mechanical polishing pad of claim 1, wherein the acrylate is a hydroxy $C_{1-8}$ alkyl ($C_{1-8}$ alkyl)acrylate.

6. The chemical mechanical polishing pad of claim 1, wherein the ingredients further comprise a diol chain extender, wherein the diol chain extender is selected from the group consisting of ethylene glycol; 1,2-propylene glycol; 1,3-propylene glycol; 1,3-propanediol; 1,1,1-trimethylolpropane; 1,2-butanediol; 1,4-butanediol; 1,3-butanediol; 2-methyl-1,3-propanediol; neopentyl glycol; 1,5-pentanediol; 3-methyl-1,5-pentanediol; 1,6-hexanediol; diethylene glycol; dipropylene glycol; hydroxyethyl resorcinol; hydroquinone bis(hydroxyethyl)ether; and, a mixture thereof.

7. A method of making a polishing layer according to claim 1, comprising:
(a) providing an isocyanate-terminated urethane prepolymer having 4 to 12 wt % unreacted NCO prepared from the reaction of a polyfunctional isocyanate, and a polyol;
(b) providing a polyamine chain extender;
(c) providing an acrylate selected from the group consisting of hydroxyalkyl (alkyl)acrylates and 2-aminoethyl (meth)acrylate;
(d) providing a free radical initiator;
(e) mixing the isocyanate-terminated urethane prepolymer and the acrylate;
(f) adding the polyamine chain extender to the combination of (e);
(g) adding the free radical initiator to the combination of (f); and,
(h) initiating a polymerization of the combination of (g) forming a polishing layer.

\* \* \* \* \*